(12) United States Patent
Wang

(10) Patent No.: US 8,588,294 B2
(45) Date of Patent: Nov. 19, 2013

(54) STATISTICAL MULTIPLEXING USING A PLURALITY OF TWO-PASS ENCODERS

(75) Inventor: Limin Wang, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 771 days.

(21) Appl. No.: 12/688,529

(22) Filed: Jan. 15, 2010

(65) Prior Publication Data

US 2011/0176600 A1 Jul. 21, 2011

(51) Int. Cl.
- H04N 7/12 (2006.01)
- H04N 11/02 (2006.01)
- H04N 11/04 (2006.01)
- G06K 9/36 (2006.01)
- G06K 9/46 (2006.01)

(52) U.S. Cl.
USPC .......... 375/240.01; 375/240.15; 382/238

(58) Field of Classification Search
USPC .................................................. 375/240.01
See application file for complete search history.

(56) References Cited

U.S. PATENT DOCUMENTS

| 5,682,204 A * | 10/1997 | Uz et al. ............ 375/240.15 |
| 2009/0074313 A1 * | 3/2009 | Ogawa ............ 382/238 |

* cited by examiner

*Primary Examiner* — Christopher S Kelley
*Assistant Examiner* — Hee-Yong Kim
(74) *Attorney, Agent, or Firm* — Thomas A. Ward

(57) ABSTRACT

A plurality of programs are statistically multiplexed using a plurality of two-pass encoders. Pictures in the plurality of programs are encoded in a first encoding pass using a plurality of first encoding modules. $R_{W\_passOne}$, which is a total number of bits used to encode all the pictures in a sequence in the plurality of programs in the first encoding pass, is determined. $R_{W\_passTwo}$, which is a total target number of bits for all pictures in a same sequence in the plurality of programs in a second encoding pass, is also determined. $R_{two,FfpicType}(i,l)$, which is a target bit allocation for each picture in each program l of the plurality of programs, is determined based on $R_{W\_passOne}$, $R_{W\_passTwo}$, and $R_{one,FfpicType}(i,l)$. $R_{one,FfpicType}(i,l)$ is a number of bits consumed for a corresponding picture in the first encoding pass. The plurality of programs are encoded using a plurality of second encoding modules and $R_{two,FfpicType}(i,l)$ in the second encoding pass to form a plurality of variable bit rate (VBR) compressed bit streams. Thereafter, the plurality of VBR compressed bit streams are multiplexed to form a single constant bit rate (CBR) bit stream.

13 Claims, 5 Drawing Sheets

STATISTICAL MULTIPLEXING USING A PLURALITY OF TWO-PASS ENCODERS

BACKGROUND

ITU-T H.264/MPEG-4 part 10 is an international video coding standard, developed by Joint Video Team (JVT) formed from experts of International Telecommunications Union Telecommunication Standardization Sector (ITU-T) Video Coding Experts Group (VCEG) and International Organization for Standardization (ISO) Moving Picture Experts Group (MPEG). ITU-T H.264/MPEG-4 part 10 is also referred to as MPEG-4 AVC (Advanced Video Coding). In MPEG-4 AVC, an interlaced video frame can be structured and coded (i.e., encoded) as a single frame picture in frame mode, or as a two separate field pictures in field mode. MPEG-4 AVC allows adaptive switching between frame and field coding mode per frame. MPEG-4 AVC allows high quality video at lower bit rates without a prohibitive increase in the complexity of applying the standard when compared to previous standards.

Multiple programs are known to be encoded using previous standards and sent over a common channel having a fixed limited bandwidth using a technique known as statistical multiplexing, which may be applied to MPEG-4 AVC. Statistical multiplexing is a type of communication link sharing in which a communication channel is divided into an arbitrary number of variable bit-rate (VBR) digital channels or data streams. The multiple programs may be statistically multiplexed using a plurality of two-pass encoders. The communication channel is known to have a bandwidth limitation. Because the multiple programs are VBR and the communication channel has a bandwidth limitation, bit distribution over the multiple programs is known to be problematic.

SUMMARY

Disclosed herein is a method for statistically multiplexing a plurality of programs using a plurality of two-pass encoders, according to an embodiment. In the method, all pictures in the plurality of programs are encoded in a first encoding pass using a plurality of first encoding modules and $R_{W\_passOne}$ is determined. $R_{W\_passOne}$ is a total number of bits used to encode a group of pictures from the plurality of programs in the first encoding pass. $R_{W\_passTwo}$, which is a total target number of bits for the same group of pictures from the plurality of programs in a second encoding pass, is also determined. $R_{two,FfpicType}(i,l)$, which is a target bit allocation for each picture in each program l of the plurality of programs, is determined based on $R_{W\_passOne}$, $R_{W\_passTwo}$, and $R_{one,FfpicType}(i,l)$. $R_{one,FfpicType}(i,l)$ is a number of bits consumed for a corresponding picture in the first encoding pass. The plurality of programs are encoded using a plurality of second encoding modules and $R_{two,FfpicType}(i,l)$ in the second encoding pass to form a plurality of variable bit rate (VBR) compressed bit streams. Thereafter, the plurality of VBR compressed bit streams are multiplexed to form a single constant bit rate (CBR) bit stream.

Also disclosed herein is a statistical multiplexing (stat mux) system for statistically multiplexing a plurality of programs. The system includes a plurality of first encoding modules configured to encode all pictures in the plurality of programs in a first encoding pass, a stat mux rate controller, a plurality of second encoding modules, and a multiplexer. The stat mux rate controller is configured to determine $R_{W\_passOne}$, $R_{W\_passTwo}$, and $R_{two,FfpicType}(i,l)$. $R_{W\_passOne}$ is a total number of bits used to encode a group of pictures from the plurality of programs in the first encoding pass. $R_{W\_passTwo}$ is a total target number of bits to encode the same group of pictures from the plurality of programs in the second encoding pass. $R_{two,FfpicType}(i,l)$ is a target bit allocation for each picture in each program l of the plurality of programs determined based on $R_{W\_passOne}$, $R_{W\_passOne}$, and $R_{one,FfpicType}(i,l)$. $R_{one,FfpicType}(i,l)$ is a number of bits consumed for a corresponding picture in the first encoding pass. The plurality of second encoding modules are configured to encode all pictures in the plurality of programs using $R_{two,FfpicType}(i,l)$ in the second encoding pass to form a plurality of variable bit rate (VBR) compressed bit streams. The multiplexer is configured to multiplex the plurality of VBR compressed bit streams to form a single CBR bit stream.

Further disclosed is a computer readable storage medium on which is embedded one or more computer programs implementing the above-disclosed method for statistically multiplexing a plurality of programs using a plurality of two-pass encoders, according to an embodiment.

As described above, the embodiments provide a method and apparatus for statistically multiplexing a plurality of programs using a plurality of two-pass encoders. Embodiments of the invention also provide a method of dynamically assigning bandwidth among the plurality of programs. The embodiments of the invention satisfy a channel condition and enhance reconstructed video quality of each of the programs at end devices. A particular program is allowed more bandwidth dependent on relative complexity. The bit allocation for each picture in the second encoding pass is enhanced.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention.

1. Statistical Multiplexing System

Figure 1:
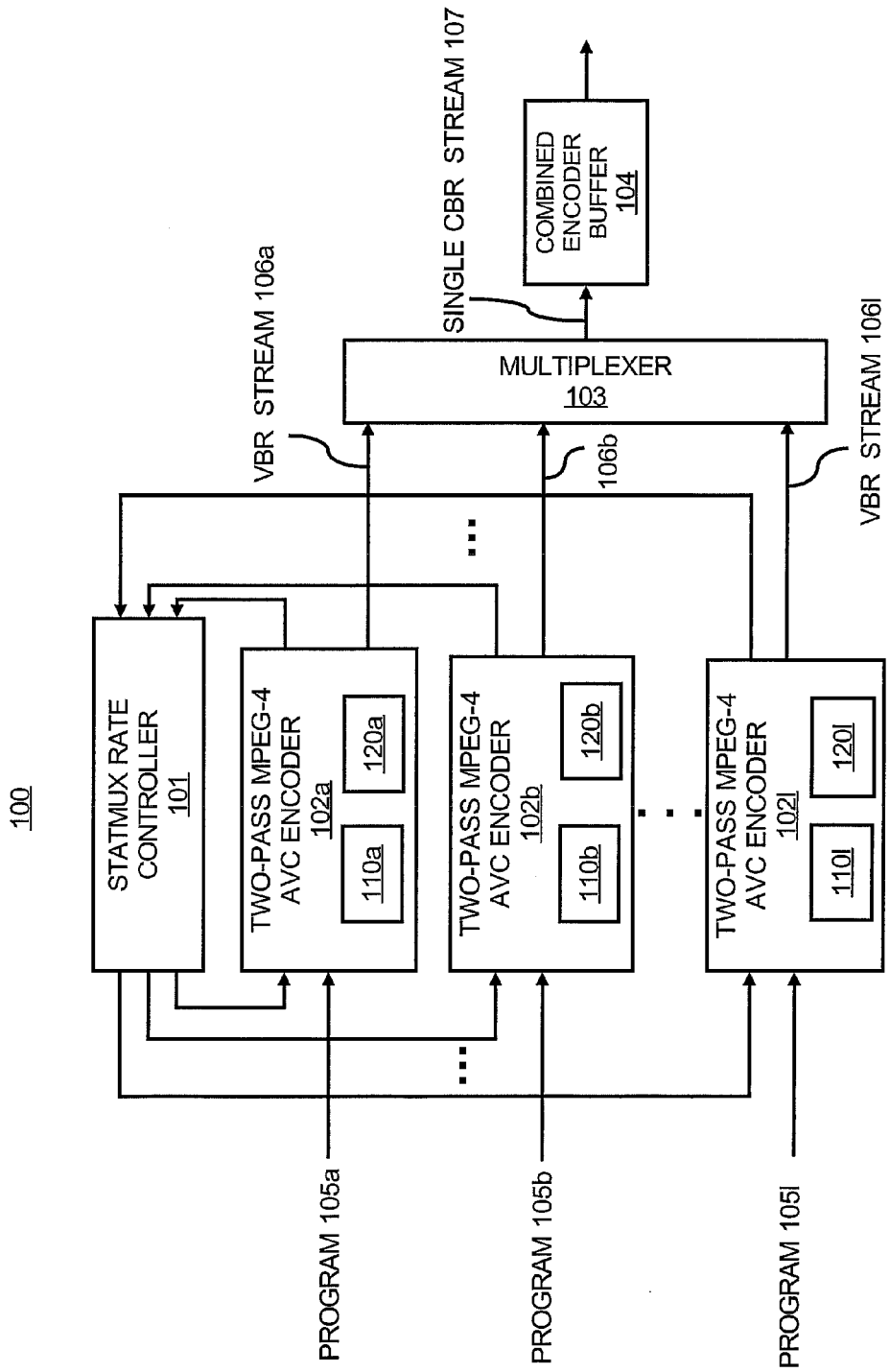
FIG. 1 illustrates a simplified block diagram of a statistical multiplexing system, according to an embodiment.

FIG. 1 illustrates a simplified block diagram of a statistical multiplexing (stat mux) system 100 configured to statistically multiplex a plurality of programs 105*a-l*. Each of the programs 105*a-l* comprises an input video sequence with a corresponding number from 1 to an integer l. The input video sequence includes a sequence of pictures in which each picture i is, for example, one of an I, P, $B_s$, or B picture in field or frame. As shown in FIG. 1, the stat mux system 100 includes a stat mux rate controller 101, a plurality of two-pass MPEG-4 AVC encoders 102a-l, a multiplexer 103, and a combined encoder buffer 104. It should be understood that the stat mux system 100 depicted in FIG. 1 may include additional components and that some of the components described herein may be removed and/or modified without departing from a scope of the stat mux system 100.

The plurality of programs 105a-l are input to the stat mux system 100 at each of the plurality of two-pass MPEG-4 AVC encoders 102a-l. The plurality of two-pass MPEG-4 AVC encoders 102a-l output a plurality of variable bit rate (VBR) streams 106a-l, for instance MPEG-4 AVC bit streams. These VBR streams 106a-l are multiplexed by the multiplexer 103 into a single constant bit rate (CBR) stream 107 for transmission or storage in the combined encoder buffer 104. The bit rate of the single CBR stream 107 may be determined by a channel rate, or alternately, by a pre-determined rate.

The two-pass MPEG-4 AVC encoders 102a-l include first encoding modules 110a-l and second encoding modules 120a-l. The first encoding modules 110a-l perform a first encoding pass on their respective input sequences (e.g., programs 105a-l) and the second encoding modules 120a-l perform a second encoding pass on the same respective input sequences after a delay has been introduced in each of the sequences.

The stat mux rate controller 101 determines coding parameters from coding statistics collected from the first encoding pass performed by the first encoding modules 110a-l. The coding parameters may include a target bit rate or target bit allocation per picture and a QP per picture to achieve the target bit rate or bit allocation. One or more of the coding parameters are provided to the second encoding modules 120a-l to control the bit allocation for each picture and for each input sequence.

Figure 2:
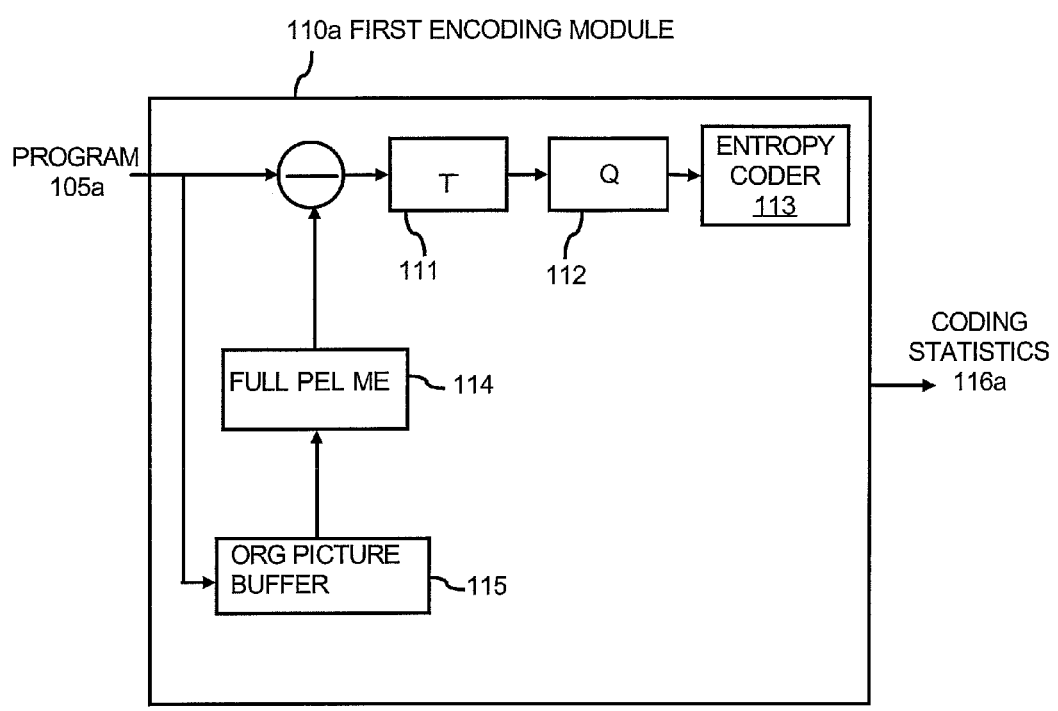
FIG. 2 illustrates a simplified block diagram of a first encoding module, according to an embodiment.
Figure 3:
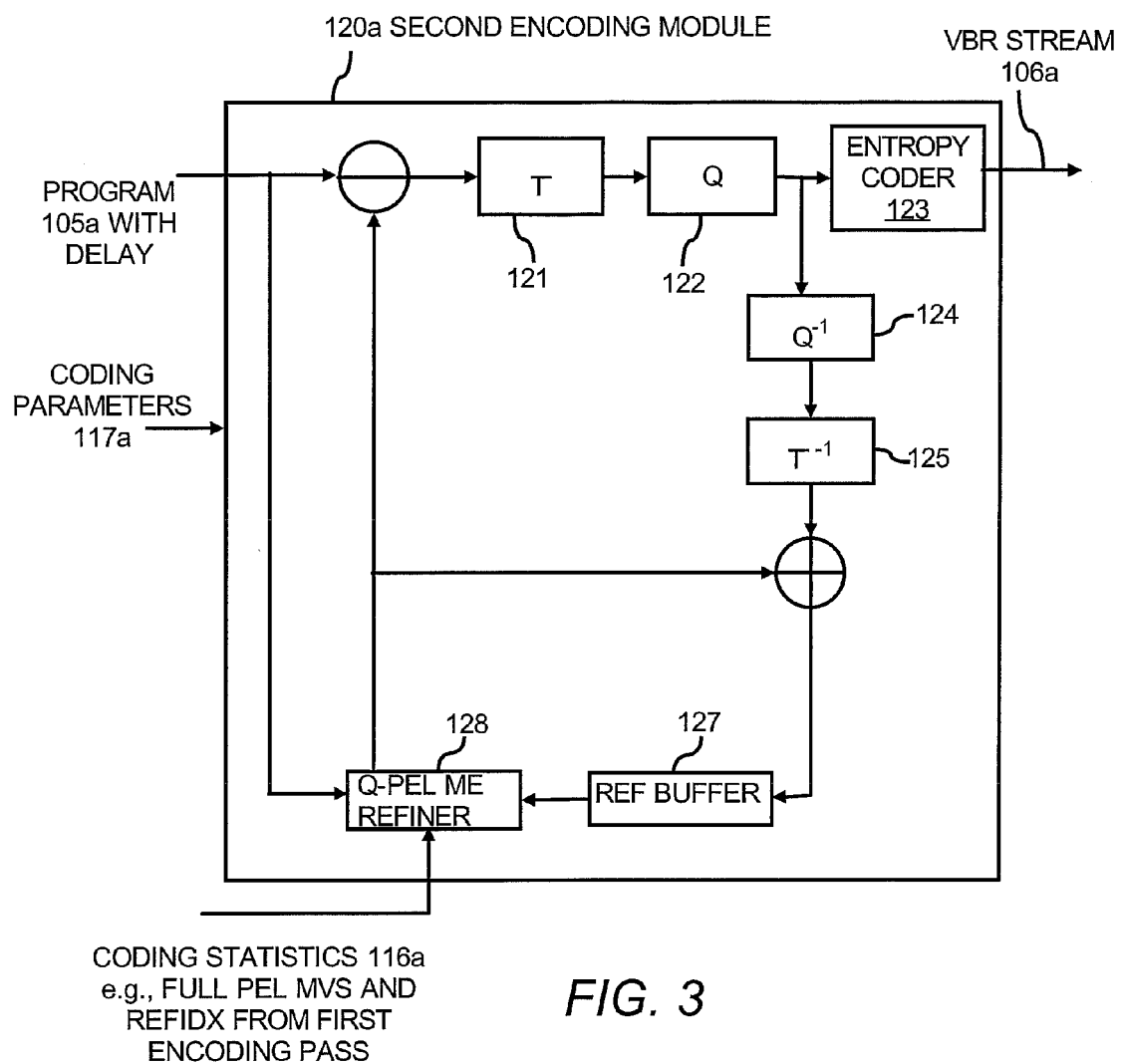
FIG. 3 illustrates a simplified block diagram of a second encoding module, according to an embodiment.

FIG. 2 shows components for the first encoding module 110a and FIG. 3 shows components for the second encoding module 120a. The same or similar components may be used for each of the first and second encoding modules shown in FIG. 1, and each of the first encoding modules 110a-l may function similarly and each of the second encoding modules 120a-l may function similarly. It should be understood that the first encoding module 110a depicted in FIG. 2 and the second encoding module 120a depicted in FIG. 3 may include additional components and that some of the components described herein may be removed and/or modified.

The first encoding module 110a include components that may be used to encode program 105a. As shown in FIG. 2, the first encoding module 110 may include a transformer 111, a quantizer 112, an entropy coder 113, a full-pel motion estimator (ME) 114, and an org picture buffer 115.

By way of example, the transformer 111 is a block transform. The block transform is an engine that converts a block of pixels in the spatial domain into a block of coefficients in the transform domain. The block transform tends to remove the spatial correlation among the pixels of a block. The coefficients in the transform domain are thereafter highly decorrelated. The quantizer 112 assigns coefficient values into a finite set of values. Quantization is a lossy operation and the information lost due to quantization cannot be recovered. The entropy coder 113 performs entropy coding, a lossless coding procedure which further removes statistical redundancy in the quantized transform coefficients. The full-pel ME 114 performs full-pel motion estimation (ME) which generates full-pel motion vectors (MVs) and associated reference index (refldx) per block, and the org pic buffer 115, holds reference pictures during the first encoding pass.

The first encoding module 110 generates coding statistics 116a. The coding statistics 116a may include average quantization parameter (QP) and associated bits per picture, a picture adaptive frame field (picAFF), and a macroblock adaptive frame field (MBAFF) decision, which may be for use in the second encoding module 120a. The first encoding module 110a may run at a variable bit rate (VBR) for uniform quality within a picture as well as from picture to picture.

The stat mux rate controller 101 collects the coding statistics 116a from the first encoding module 110a, and calculates, from one or more of the coding statistics 116a, coding parameters, such as target bit allocation/rate and/or QP per current picture for the input program 105a. The coding parameters are shown in FIG. 3 as coding parameters 117a. The second encoding module 120b then performs the second encoding pass using one or more of the coding parameters.

FIG. 3 shows the second encoding module 120a. The second encoding module 120a performs a second encoding pass to encode the delayed input program, shown as program 105a with delay. There is a delay, for example, of one or half a second introduced in the program 105a before sending it to the second encoding module 120a. The second encoding module 120a also receives coding parameters 117a from the stat mux controller 101 and also receives one or more of the coding statistics 116a determined from the first encoding pass. The coding parameters 117a and the coding statistics 116a are used by the second encoding module 120a to perform the second encoding pass for generating the VBR stream 106a.

By way of example, as shown in FIG. 3, the second encoding module 120a may include similar components configured to perform similar processes as those used in the first encoding module 110a. In addition, the second encoding module 120a may include a dequantizer 124 that is configured to perform an inverse quantization operation, an inverse transformer 125 and a Q-pel ME refiner 128. The inverse transformer 125 is configured to perform a reverse transform, for instance from a block of coefficients in the transform domain to a block of pixels in the spatial domain. The Q-pel ME refiner 128 performs Q-pel refinement of MVs from the first encoding pass.

The second encoding module 120a may leverage the coding statistics 116a to perform the second encoding pass. For example, the first encoding module 110a may only perform full-pel ME over pictures. The first encoding module 110a may select candidates of code modes per MB using non-rate distortion (RD) cost function. Additionally, the first encoding module 110a may apply a fixed QP value to all the MBs per picture of picture type I, P, $B_s$, or B in frame or field (picType∈{I,P,$B_s$,B} in Ff∈{frame,field}) per sequence. The fixed QP value may be further modulated per MB by the MB's local activity. The use of fixed QP results in a smooth quality within a picture of picType∈{I,P,$B_s$,B} in Ff∈{frame,field} and a stable quality along a time domain. The number of bits generated per picture, however, may vary from picture to picture depending upon the picture complexity and scene content.

The coding statistics 116a collected from the first encoding module 110a include $Q_{one,Ff,picType}(i)$, and $R_{one,Ff,picType}(i)$. $Q_{one,Ff,picType}(i)$ is an average QP for picture i of picType∈{I,P,$B_s$,B} in Ff∈{frame,field}. $R_{one,Ff,picType}(i)$ is a number of bits for picture i of picType∈{I,P,$B_s$,B} in Ff∈{frame,field}. The first encoding module 110 is a few pictures, for instance a group of pictures (GOP), ahead of the second encoding module 120. Hence, a total number of bits per GOP, that is, $$R_{GOP\_passone} = \sum_{GOP} R_{one,Ff,picType}(i),$$

is also available for use in encoding pictures in the second encoding module 120a.

In one embodiment, instead of performing a complete ME, the second encoding module 120a only refines the ME results obtained from the first encoding pass. Specifically, the second encoding module 120a receives the full-pel MVs and the associated refIdx from the first encoding pass. The second encoding module 120a then uses the full-pel ME results as starting points and further performs ME at quarter pel (Q-pel) resolution within a small search window. The second encoding module 120a also makes a final decision on code mode per MB among the candidates selected in the first encoding pass using non-RD cost function, RD cost function, or combination of non-RD cost function and RD cost function.

ME, the most time consuming task in an MPEG-4 AVC encoder, and similarly code mode selection, thus may not be duplicated in the first encoding module 110a and the second encoding module 120a. Instead, the first encoding module 110a and the second encoding module 120a share the tasks. The first encoding module 110a performs a coarse ME at full-pel resolution and eliminates a large number of possible code modes per MB. The second encoding module 120a refines the ME at Q-pel resolution and selects the final mode among a limited number of candidates.

The stat mux rate controller 101 controls a final bit rate of the two-pass MPEG-4 AVC encoders 102a-l by adjusting the QP in the second encoding module 120a. The second encoding module 120a receives the coding parameters 117a from the stat mux rate controller 101, and determines the QP value per MB or per picture.

2. Rate Control in Statistical Multiplexing System

Rate control is an engine that dynamically adjusts encoding parameters so that the resulting compressed bit rate can meet a target bit rate. The stat mux rate controller 101 uses rate control to regulate the single CBR stream 107 to satisfy a channel condition and to enhance reconstructed video quality of each of the programs 105a-l at end devices. A particular program is allowed more bandwidth dependent on relative complexity in respect to other programs in the plurality of programs 105a-l.

The plurality of programs 105a-l may be at any frame rate, for example, 30 frames per second or 24 frames per second. Each picture of the plurality of programs 105a-l may be encoded in either frame or field mode. Each frame or field picture may be an I, P, $B_s$ or B picture. Pictures are encoded at picture instants.

Each of the plurality of two-pass MPEG-4 AVC encoders 102a-l encodes a frame or field picture from the plurality of programs 105a-l within a period equal to, or less than, the reciprocal of the frame rate. For example, for a program at 30 frames per second, a two-pass MPEG-4 AVC encoder 102 takes a maximum of 1/30 seconds to encode a frame picture and a maximum of 1/60 seconds to encode a field picture. Given a particular program from the plurality of programs 105a-l, the two-pass MPEG-4 AVC encoder 102 moves all the compressed bits of the most recently encoded picture into the combined encoder buffer 104 at the picture instant.

Figure 4:
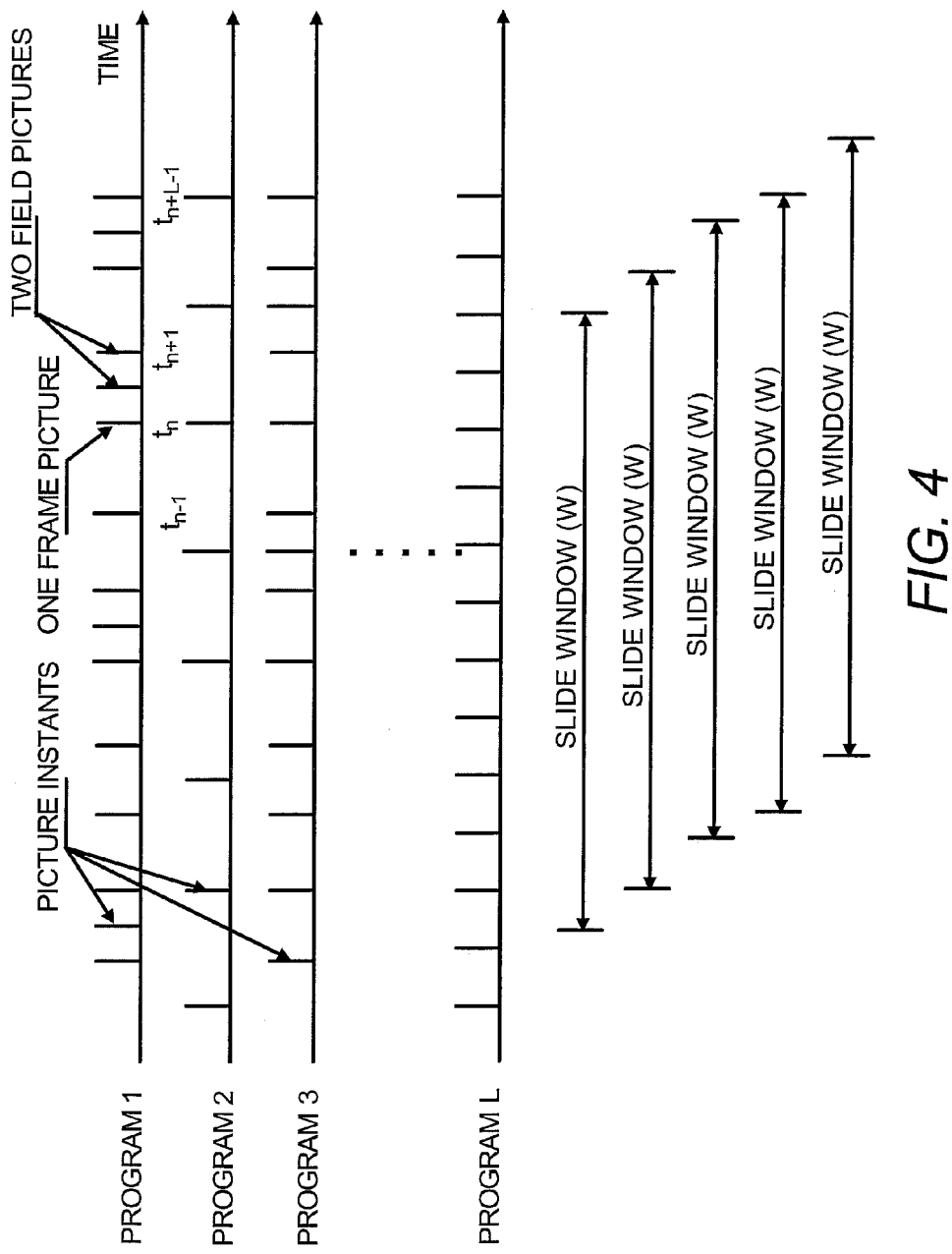
FIG. 4 illustrates a simplified diagram of a sliding window, according to an embodiment.

According to an embodiment, the plurality of two-pass MPEG-4 AVC encoders 102a-l encode the plurality of programs 105a-l by applying a conceptual sliding window. Applying a sliding window includes encoding pictures in the sliding window. A sliding window W, in this particular example, is shifted along the time domain at every (frame or field) picture instant of the plurality of programs 105a-l. FIG. 4 shows picture instants as vertical hash marks in the timelines, and some are labeled 401. A frame picture is labeled 402, and two field pictures are labeled 403. There are other frame and field pictures, although not labeled.

Because the plurality of programs 105a-l may have different frame rates and a frame can be coded as single frame picture or two field pictures, a shifted period may vary from time to time. $t_n$ is the time of a current picture instant as shown in FIG. 4 For example, if $\Delta_n = t_n - t_{n-1}$ is the interval in seconds between two shift instants $t_n$ and $t_{n-1}$, $\Delta_n$ may not be equal to $\Delta_m$, if n≠m. At every shift instant, encoded (frame and field) pictures of I, P, Bs or B are moved out of the sliding window, and new (frame and field) pictures of I, P, B, or B are moved in. Given a shift instant $t_{n-1}$, encoding of L current pictures from the programs 105a-l should be completed at instant $t_n$, $t_{n+1}$, or $t_{n+L-1}$. The L current pictures from the plurality of programs 105a-l may not be synchronized. The numbers of pictures moving into and a numbers of pictures moving out of the sliding window at different instances may not be the same, with a difference of any number between 1 to L.

Given a total channel rate in bits per second, $R_{channel}$, and the sliding window size of W seconds, a nominal number of bits for the slide window of L programs, $R_{W\_no\ min\ al}$, should logically be set to, $$R_{W\_no\ min\ al} = W \times R_{channel} \qquad \text{Equation (1)}$$

The programs 105a-l within the sliding window share this bit budget of $R_{W\_no\ min\ al}$. According to an embodiment, the stat mux system 100 distributes the available bits over the programs 105a-l according to relative complexity measures of the programs 105a-l. Programs among the plurality of programs 105a-l that are more complex are assigned more bits and less complex programs less bits. For a given aggregate rate, the rate assigned for a program depends on not only the program's own complexity measure, but also on complexity measures of other programs. Because each program's complexity may vary over time, each program's relative complexity measures may also vary. The bit allocation over the plurality of programs 105a-l is therefore a time-varying function. To smooth out the variation of the bit allocation, the sliding window should be long enough in order to be able to cover many pictures from each program 1, for instance one second or more long.

As shown in FIG. 1. the multiplexing unit 103 receives the plurality of VBR compressed bit streams from the plurality of MPEG-4 AVC encoders 102a-l. The multiplexing unit 103 thereafter multiplexes the plurality of VBR compressed bit streams to form a single CBR bit stream. The single CBR bit stream formed from the plurality of VBR compressed bit streams is sent to the combined encoder buffer 104 before outputting over the channel. The stat mux rate controller 101 ensures that the single CBR bit stream does not exceed an upper boundary or underflow a lower boundary of the combined encoder buffer 104 by implementing rate control for each of the VBR streams 106a-l using the coding parameters.

3. Statistical Multiplexing Methods for Two-Pass Encoders

Figure 5:
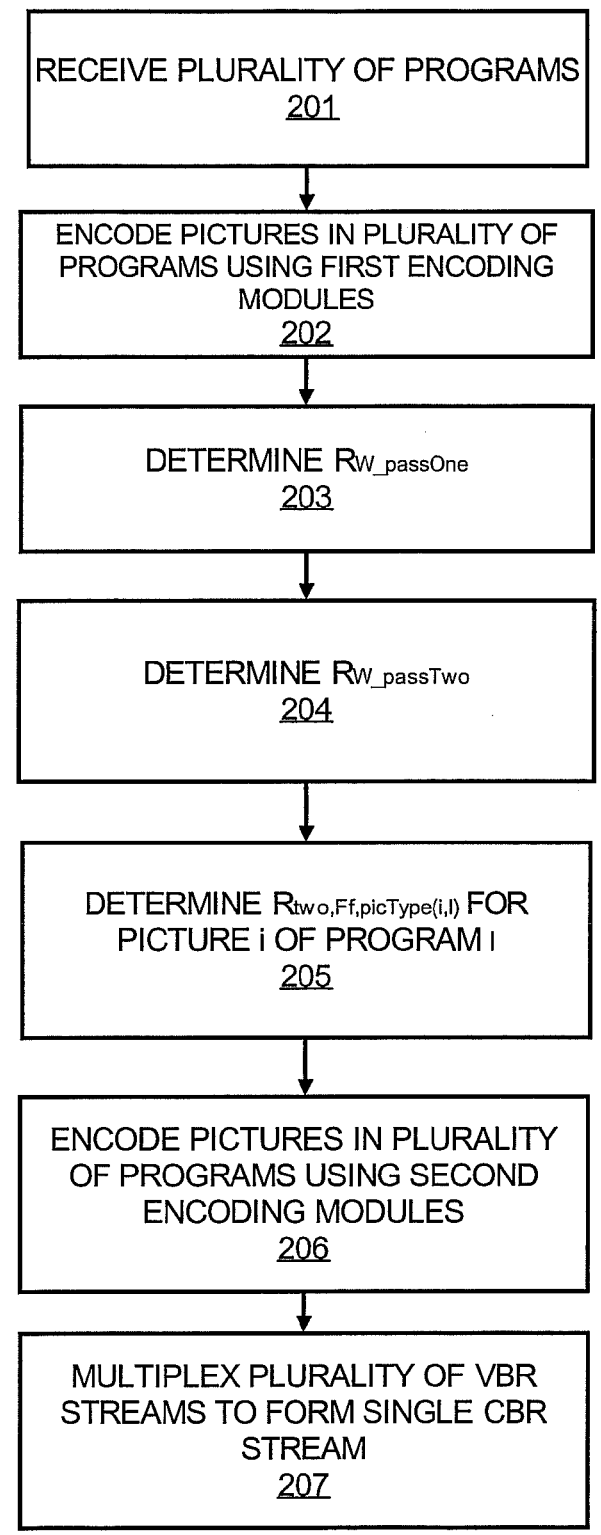
FIG. 5 illustrates a flow diagram of a method of statistically multiplexing a plurality of programs using a plurality of two-pass encoders, according to an embodiment.

Examples of a method in which the stat mux system 100 may be employed to statistically multiplex a plurality of programs 105a-l is now described with respect to the following flow diagrams of the method 200 depicted in FIG. 5. It should be apparent to those of ordinary skill in the art that the method 200 represents a generalized illustration and that other steps may be added or existing steps may be removed, modified or rearranged without departing from the scope of the method 200. In addition, the method 200 is described with respect to the stat mux system 100 by way of example and not limitation, and the method 200 may be used in other systems.

Some or all of the operations set forth in the method 200 may be contained as one or more computer programs stored in any desired computer readable medium and executed by a processor on a computer system. Exemplary computer readable media that may be used to store software operable to implement the present invention include but are not limited to conventional computer system RAM, ROM, EPROM, EEPROM, hard disks, or other data storage devices.

The method 200, as shown in FIG. 5, is a generalized illustration of a method for statistically multiplexing a plurality of programs 105a-l using a plurality of two-pass MPEG-4 AVC encoders 102a-l. Although illustrated with respect to two-pass MPEG-4 AVC encoders, the method 200 may be applied to any two-pass encoders. Additionally, although the method 200 is illustrated with regards to a sliding windows approach, the plurality of programs 105a-l may be multiplexed using other conceptual approaches, for instance a remaining bits method.

At step 201, the stat mux system 100 receives the plurality of programs 105a-l at the plurality of two-pass MPEG-4 AVC encoders 102a-l. Each of the plurality of programs 105a-l may be an input video sequence. The stat mux system 100 may be located, for instance, in a head end of a cable communications system or other communications system.

At step 202, the stat mux system 100 encodes pictures in the plurality of programs 105a-l in a first encoding pass using a plurality of first encoding modules 110. The plurality of first encoding modules 110 may collect coding statistics, including a total number of bits used to encode a group of pictures from the plurality of programs 105a-l in the first encoding pass.

At step 203, the stat mux rate controller 101 determines $R_{W\_passOne}$. $R_{W\_passOne}$ is a total number of bits used to encode the group of pictures from the plurality of programs 105a-l in the first encoding pass. For instance, the group of pictures and $R_{W\_passOne}$ may be determined by applying a sliding window in the first encoding pass. The stat mux rate controller 101 may determine $R_{W\_passOne}$ by receiving $R_{W\_passOne}$ from the plurality of first encoding modules 110a-l. According to an embodiment, $R_{W\_passOne}$ is a total number of bits used for all the pictures of in the plurality of programs 105a-l within a sliding window in the first encoding pass, and $R_{one,Ff,picType}(i,l)$ is a number of bits for picture i of program l within the sliding window in the first encoding pass. Therefore $R_{W\_passOne}$ may be determined using an equation, $$R_{W\_passOne} = \sum_{i,l \in \{W\}} R_{one,Ff,picType}(i, l),\qquad \text{Equation (2)}$$

in which picture i of program l is of $picType \in \{I, P, B_s, B\}$ in $Ff \in \{frame, field\}$.

At step 204, the stat mux rate controller 101 determines $R_{W\_passTwo}$. $R_{W\_passTwo}$ is a total target number of bits for all pictures in the plurality of programs within the sliding window in a second encoding pass. According to an embodiment, the stat mux rate controller 101 in the second encoding pass sets a target number of bits, $R_{two,Ff,picType}(i,l)$ for a picture i of program l from the second encoding pass. The sum of the target bits of all the pictures of the plurality of programs 105a-l within the sliding window should be equal to the number of bits assigned for the sliding window, $R_{W\_passTwo}$, that is, $$R_{W\_passTwo} = \sum_{i,l \in \{W\}} R_{two,Ff,picType}(i, l).\qquad \text{Equation (3)}$$

At step 205, the stat mux system 100 determines $R_{two,Ff,picType}(i,l)$. $R_{two,Ff,picType}(i,l)$ is a target bit allocation for a picture i in each program l of the plurality of programs based on $R_{W\_passOne}$, $R_{W\_passTwo}$, and $R_{one,Ff,picType}(i,l)$. $R_{one,Ff,picType}(i,l)$ is a number of bits consumed for a corresponding picture in the first encoding pass. According to an embodiment, to achieve a relatively smooth quality per picture and a small quality variation along the time domain, similarly to the first encoding pass, the ratio of $R_{two,Ff,picType}(i,l)$ over $R_{W\_passTwo}$ in the second pass should theoretically be the same as the ratio of $R_{one,Ff,picType}(i,l)$ over $R_{W\_passOne}$ within the same sliding window, that is, $$\frac{R_{two,Ff,picType}(i, l)}{R_{W\_passTwo}} = \frac{R_{one,Ff,picType}(i, l)}{R_{W\_passOne}},\qquad \text{Equation (4)}$$

or $$R_{two,Ff,picType}(i, l) = R_{one,Ff,picType}(i, l) \times \frac{R_{W\_passTwo}}{R_{W\_passOne}}.\qquad \text{Equation (5)}$$

Equation (5) gives a target number of bits for picture i of program l, which is of $picType \in \{I, P, B_s, B\}$ in $Ff \in \{frame, field\}$ for the second encoding pass. The target rate for picture i of program l determined above may be checked against the upper and lower boundaries. If necessary, the target rate may be clipped in order to prevent the overflow and/or underflow of the encoder and/or decoder buffers.

Both $R_{W\_passOne}$ and $R_{W\_passTwo}$ used in the Equations (2) to (5) need to be updated after encoding a picture in order to achieve the target bit rate in the second encoding pass. For the first encoding pass, since $R_{one,Ff,picType}(i,l)$ are available for all the pictures within the current sliding window, $R_{W\_passOne}$ can be calculated as $$R_{W\_passOne} = \sum_{i,l \in \{W\}} R_{one,Ff,picType}(i, l).\qquad \text{Equation (6)}$$

For the second encoding pass, $R_{W\_passTwo}$ is initially set as, $$R_{W\_passTwo} = R_{W\_nominal}.\qquad \text{Equation (7)}$$

$R_{W\_passTwo}$ is updated from time to time. The update period can be set to be a few seconds, a second, a fraction of a second, or even a picture interval. Let $t_i$ be a current update instant, and $\overline{R}_{W\_passTwo}(i-1)$ be number of bits generated from the plurality of programs 105a-l within the sliding window right before the current update instant. Then, $R_{W\_passTwo}$ is updated at time instant $t_i$ as $$R_{W\_passTwo}(i) = 2 \times R_{W\_nominal} - \overline{R}_{W\_passTwo}(i-1)\qquad \text{Equation (8)}$$

$R_{W\_passTwo}(i)$ is unchanged until a next update instant i+1.

At step 206, the stat mux system 100 encodes the plurality of programs using a plurality of second encoding modules 120a-l and $R_{two,Ff,picType}(i,l)$ to form a plurality of variable bit rate (VBR) compressed bit streams.

At step 207, the stat mux system 100 multiplexes the plurality of VBR compressed bit streams using the multiplexing unit 103 to form the single CBR bit stream. The stat mux system 100 thereafter outputs the single CBR bit stream using the channel and the combined encoder buffer 104.

4. Further Rate Control in Statistical Multiplexing System

Given a target number of bits for picture i of program l, $R_{two,Ff,picType}(i,l)$ as determined above at Equation (5), the next task is to have the actual number of bits consumed for picture i of program l be equal to, or close to, $R_{two,Ff,picType}(i,l)$. This can be achieved by adjusting the QP value at either MB or picture level. Adjustment of QP value at MB level often results in better rate control while at picture, more uniform picture quality.

With a given target rate for picture i of program l, a global QP value at picture level can be determined, based upon the coding statistics collected from pass-one, as $$Q_{two,Ff,picType}(i, l) = Q_{one,Ff,picType}(i, l) - \alpha \times \log_2\left(\frac{R_{two,Ff,picType}(i, l)}{R_{one,Ff,picType}(i, l)}\right) \quad \text{Equation (9)}$$

in which α may be set to a value of 6.

Equation (9) gives a global QP for picture i of program l, with which the number of bits generated for the picture can be close to the given target number of bits for the picture, $R_{two,Ff,picType}(i,l)$. This is an approximate Q-R model per picture. A specific α value may be an acceptable approximation for some sequences, but may be bad for others. Practically, the QP value determined using Equation (9) may result in a rate off the target number of bits, $R_{two,Ff,picType}(i,l)$. Hence it is necessary to update the above model from time to time.

Given a target rate, $R_{two,Ff,picType}(i,l)$, for a current picture i of program l, a global QP value may be calculated as, $$Q_{two,Ff,picType}(i, l) = Q_{one,Ff,picType}(i, l) - \alpha_{Ff,picType}(i, l) \times \log_2\left(\frac{R_{two,Ff,picType}(i, l)}{R_{one,Ff,picType}(i, l)}\right). \quad \text{Equation (10)}$$

$Q_{two,Ff,picType}(i,l)$ may be applied to the current picture, resulting in an output bitstream with a actual rate of $\bar{R}_{two,Ff,picType}(i,l)$.

Thereafter, α value is updated for next picture i+1 of program l as, $$\alpha_{Ff,picType}(i+1, l) = -\frac{Q_{two,Ff,picType}(i, l) - Q_{one,Ff,picType}(i, l)}{\log_2 \bar{R}_{two,FF,picType}(i, l) - \log_2 R_{one,Ff,picType}(i, l)}. \quad \text{Equation (11)}$$

The initial α value may be set to 6, or any other reasonable value.

In addition, if additional cycles are available, the α value may be iteratively updated within the same current picture using an iterative process in the plurality of second encoding modules 120a-l. For instance, a global QP value may be calculated using the α value derived from previous picture. The global QP value is thereafter applied to the current picture, and the α value is updated using the new resulting rates. With the updated α, a new global QP value is then calculated and applied for the same current picture. The iterative process may be repeated until the updated α value gives a QP value with a rate close to the target rate.

Specifically, for a current picture i of program l with a given target rate, $R_{two,Ff,picType}(i,l)$, the iterative process sets j=0 and $$\alpha_{2,j} = \alpha_{Ff,picType}(i,l) \quad \text{Equation (12)}$$

$$Q_{2,j} = Q_{two,Ff,picType}(i,l) \quad \text{Equation (13)}$$

$$R_{2,j} = \bar{R}_{two,Ff,picType}(i,l) \quad \text{Equation (14)}$$

$$\Delta_{2,j} = R_{2,j} - R_{two,Ff,picType}(i,l). \quad \text{Equation (15)}$$

If $\Delta_{2,j} = 0$, the iterative process stops. Otherwise, the iterative process continues as hereinbelow.

Set a new QP value as, $$Q_{2,j+1} = \begin{cases} Q_{2,l} + 1 & \Delta_{2,j} > 0 \\ Q_{2,l} - 1 & \text{if } \Delta_{2,j} < 0 \end{cases} \quad \text{Equation (16)}$$

Apply $Q_{2,j+1}$ to picture i of program l, resulting in an output bitstream with a rate of $R_{2,j+1}$, and calculate the difference between the output rate and the target rate as $$\Delta_{2,j+1} = R_{2,j+1} - R_{two,Ff,picType}(i,l) \quad \text{Equation (17)}$$

If $\Delta_{2,j+1} = 0$, the iterative process stops. Otherwise, the iterative process continues with updating the α value as $$\alpha_{2,j+1} = -\frac{Q_{2,j+1} - Q_{2,j}}{\log_2 R_{2,j+1} - \log_2 R_{2,j}}. \quad \text{Equation (18)}$$

If $\Delta_{2,j+1}$ and $\Delta_{2,j}$ have different signs, set the α value for next picture i+1 of program l as $$\alpha_{Ff,picType}(i+1, l) = \begin{cases} \alpha_{2,j+1}, & |\Delta_{2,j+1}| \le |\Delta_{2,j}| \\ \alpha_{2,j}, & |\Delta_{2,j+1}| > |\Delta_{2,j}| \end{cases} \quad \text{Equation (19)}$$

and stops. Otherwise, if $\Delta_{j+1}$ and $\Delta_j$ have the same sign, move on to next step.

Set j=j+1 and calculate a new QP value using linear model as $$Q_{2,j+1} = Q_{2,j} + \frac{Q_{2,j} - Q_{2,j-1}}{\log_2 R_{2,j} - \log_2 R_{2,j-1}}(\log_2 R_{two,Ff,picType}(i, l) - \log_2 R_{2,j}). \quad \text{Equation (20)}$$

or using a non-linear model as $$Q_{2,j+1} = Q_{2,j} - \alpha_{Ff,picType}(i, l) \times \log_2\left(\frac{R_{two,Ff,picType}(i, j)}{R_{2,j}}\right), \quad \text{Equation (21)}$$

The new QP value, $Q_{2,j+1}$, is then applied to the same picture i of program l, and the difference between the new output rate $R_{2,j+1}$ and the target rate $R_{two,Ff,picType}(i,l)$ is calculated as Equation (17). The iterative process then repeats.

Among all the QP values that have been used above, the one with an output rate closest to the target rate is the final QP for the current picture. The compressed bits associated with the final QP values are the final bits for the current picture i of the current program l. The α value may be updated one or more times per picture, or the coefficients of a picture are quantized and encoded twice.

5. Computing Apparatus for Statistical Multiplexing

A computing apparatus (not shown) may be configured to implement or execute one or more of the processes required to statistically multiplex the plurality of programs 105a-l using a plurality of two-pass encoders depicted in FIG. 5, according to an embodiment. The computing apparatus may include a processor that may implement or execute some or all of the steps described in the method depicted in FIG. 5. Commands and data from the processor may be communicated over a communication bus. The computing apparatus may also include a main memory, such as a random access memory (RAM), where the program code for the processor, may be executed during runtime, and a secondary memory. The secondary memory includes, for example, one or more hard disk drives and/or a removable storage drive, representing a floppy diskette drive, a magnetic tape drive, a compact disk drive, etc., where a copy of the program code for one or more of the processes depicted in FIG. 5 may be stored. In addition, the processor(s) may communicate over a network, for instance, the Internet, LAN, etc., through a network adaptor.

As described above, the embodiments provide a method and apparatus for statistically multiplexing a plurality of programs using a plurality of two-pass encoders. Embodiments of the invention also provide a method of dynamically assigning bandwidth among the plurality of programs. The embodiments of the invention satisfy a channel condition and enhance reconstructed video quality of each of the programs at end devices. Because sequences of high complexity in a plurality of programs tend to occur at different times, the statistical multiplexing system more effectively distributes bandwidth.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the embodiments of the invention.

What is claimed is:

1. A method for statistically multiplexing a plurality of programs using a plurality of two-pass encoders, the method comprising:
encoding pictures in the plurality of programs in a first encoding pass using a plurality of first encoding modules;
determining $R_{W\_passOne}$, wherein $R_{W\_passOne}$ is a total number of bits used to encode a group of pictures in the plurality of programs in the first encoding pass;
determining $R_{W\_passTwo}$, wherein $R_{W\_passTwo}$ is a total target number of bits for the group of pictures in the plurality of programs in a second encoding pass;
determining $R_{two,Ff,picType}(i,l)$, wherein $R_{two,Ff,picType}(i,l)$ is a target bit allocation for each picture i in each program l of the plurality of programs based on $R_{W\_passOne}$, $R_{W\_passTwo}$, and $R_{one,Ff,picType}(i,l)$, and $R_{one,Ff,picType}(i,l)$ is a number of bits consumed for a corresponding picture in the first encoding pass;
encoding the plurality of programs using a plurality of second encoding modules and $R_{two,Ff,picType}(i,l)$ in the second encoding pass to form a plurality of variable bit rate (VBR) compressed bit streams; and
multiplexing the plurality of VBR compressed bit streams to form a single constant bit rate (CBR) bit stream,
wherein encoding the plurality of programs using a plurality of second encoding modules and $R_{two,Ff,picType}(i,l)$ comprises:
determining a sliding window over the plurality of programs that slides along a time domain; and
using $R_{W\_passTwo}$ in the sliding window to encode the plurality of programs, wherein using $R_{W\_passTwo}$ in the sliding window to encode the plurality of programs comprises:
in the second encoding pass, setting $R_{W\_passTwo}$ for the second encoding pass to a nominal value, $R_{W\_passTwo} = R_{W\_no\ min\ al}$
after a picture is encoded, removing the picture from the sliding window and moving a new picture into the sliding window, and
as pictures are being removed from and moved into the sliding window in the second encoding pass, updating $R_{W\_passTwo}$, wherein the updated $R_{W\_passTwo}$ equals:

$$R_{W\_passTwo}(i) = 2 \times R_{W\_no\ min\ al} - \overline{R}_{W\_passTwo}(i-1),$$

wherein $\overline{R}_{W\_passTwo}(i-1)$ is a number of bits generated within the sliding window right before the update.

2. The method of claim 1, wherein, $$R_{two,Ff,picType}(i, l) = R_{one,Ff,picType}(i, l) \times \frac{R_{W\_passTwo}}{R_{W\_passOne}}.$$

3. The method of claim 1, wherein, $$R_{W\_passOne} = \sum_{i,l \in \{W\}} R_{one,Ff,picType}(i, l),$$

wherein (W) represents a range for the sliding window.

4. The method of claim 1, further comprising outputting the single CBR bit stream or storing the single CBR bit stream.

5. The method of claim 1, further comprising:
determining a QP value to control an actual number of bits consumed in the second encoding pass.

6. The method of claim 5, wherein the QP value is determined for the picture i of program l based on a Q-R model represented by $$Q_{two,Ff,picType}(i, l) = Q_{one,Ff,picType}(i, l) - \alpha \times \log_2\left(\frac{R_{two,Ff,picType}(i, l)}{R_{one,Ff,picType}(i, l)}\right),$$

wherein α is adjusted for the QP value ranges, the picture type, and the complexity, wherein the complexity is for the picture i.

7. A method for statistically multiplexing a plurality of programs using a plurality of two-pass encoders, the method comprising:
encoding pictures in the plurality of programs in a first encoding pass using a plurality of first encoding modules;

determining $R_{W\_passOne}$, wherein $R_{W\_passOne}$ is a total number of bits used to encode a group of pictures in the plurality of programs in the first encoding pass;

determining $R_{W\_passTwo}$, wherein $R_{W\_passTwo}$ is a total target number of bits for the group of pictures in the plurality of programs in a second encoding pass;

determining $R_{two,Ff,picType}(i,l)$, wherein $R_{two,Ff,picType}(i,l)$ is a target bit allocation for each picture i in each program l of the plurality of programs based on $R_{W\_passOne}$, $R_{W\_passTwo}$, and $R_{one,Ff,picType}(i,l)$, and $R_{one,Ff,picType}(i,l)$ is a number of bits consumed for a corresponding picture in the first encoding pass;

encoding the plurality of programs using a plurality of second encoding modules and $R_{two,Ff,picType}(i,l)$ in the second encoding pass to form a plurality of variable bit rate (VBR) compressed bit streams; and multiplexing the plurality of VBR compressed bit streams to form a single constant bit rate (CBR) bit stream, wherein the QP value is determined for the picture i of program l based on a Q-R model represented by $$Q_{two,Ff,picType}(i, l) = Q_{one,Ff,picType}(i, l) - \alpha \times \log_2\left(\frac{R_{two,Ff,picType}(i, l)}{R_{one,Ff,picType}(i, l)}\right),$$

wherein $\alpha$ is adjusted for the QP value ranges, the picture type, and the complexity, wherein the complexity is for the picture i, and wherein the $\alpha$ is updated as:

$$\alpha_{Ff,picType}(i+1, l) = -\frac{Q_{two,Ff,picType}(i, l) - Q_{one,Ff,picType}(i, l)}{\log_2 \overline{R}_{two,FF,picType}(i, l) - \log_2 R_{one,Ff,picType}(i, l)}$$

wherein the value $\overline{R}_{two,Ff,picType}(i,l)$ is an actual number of the bits consumed in the second pass when the value $Q_{two,Ff,picType}(i,l)$ is applied to the picture i.

8. A statistical multiplexing (stat mux) system for statistically multiplexing a plurality of programs, the stat mux system comprising:

a plurality of first encoding modules configured to encode pictures in the plurality of programs in a first encoding pass;

a stat mux rate controller including a circuit configured to determine:

$R_{W\_passOne}$, wherein $R_{W\_passOne}$ is a total number of bits used to encode a group of pictures in the plurality of programs in the first encoding pass, $R_{W\_passTwo}$, wherein $R_{W\_passTwo}$ is a total target number of bits to encode the group of pictures in the plurality of programs in the second encoding pass, $R_{two,Ff,picType}(i,l)$, wherein $R_{two,Ff,picType}(i,l)$ is a target bit allocation for each picture i in each program l of the plurality of programs based on $R_{W\_passOne}$, $R_{W\_passTwo}$, and $R_{one,Ff,picType}(i,l)$, and $R_{one,Ff,picType}(i,l)$ is a number of bits consumed for a corresponding picture in the first encoding pass;

a plurality of second encoding modules configured to:
encode all pictures in the plurality of programs using $R_{two,Ff,picType}(i,l)$ in the second encoding pass to form a plurality of variable bit rate (VBR) compressed bit streams;

determine a sliding window over the plurality of programs that slides along a time domain; and use $R_{W\_passTwo}$ in the sliding window to encode the plurality of programs: and set $R_{W\_passTwo}$ for the plurality of second encoding modules to encode the pictures in the second encoding pass to a nominal value, $R_{W\_passTwo}=R_{W\_no\ min\ al}$;

the plurality of second encoding modules:
to encode the pictures in the second encoding pass,
after a picture is encoded, to remove the picture from the sliding window and move a new picture into the sliding window; and
wherein as pictures are being removed from and moved into the sliding window in the second encoding pass, the stat mux rate controller is configured to update $R_{W\_passTwo}$, wherein the updated $R_{W\_passTwo}$ equals $$R_{W\_passTwo}(i) = 2 \times R_{W\_no\ min\ al} - \overline{R}_{W\_passTwo}(i-1)$$

wherein $\overline{R}_{W\_passTwo}(i-1)$ is a number of bits generated within the sliding window right before the update; and a multiplexer configured to multiplex the plurality of VBR compressed bit streams to form a single CBR bit stream.

9. The stat mux system of claim 8, wherein, $$R_{two,Ff,picType}(i, l) = R_{one,Ff,picType}(i, l) \times \frac{R_{W\_passTwo}}{R_{W\_passOne}}.$$

10. The stat mux system of claim 8, wherein, $$R_{W\_passOne} = \sum_{i,l \in \{W\}} R_{one,Ff,picType}(i, l).$$

11. The stat mux system of claim 8, wherein the multiplexer is further configured to output the single CBR bit stream or store the single CBR bit stream.

12. The stat mux system of claim 8, wherein the plurality of second encoding modules is further configured to:
determine a QP value to control an actual number of bits consumed in the second encoding pass.

13. The stat mux system of claim 12, wherein the plurality of second encoding modules is configured to determine the QP value for the picture i of program l based on a Q-R model represented by $$Q_{two,Ff,picType}(i, l) = Q_{one,Ff,picType}(i, l) - \alpha \times \log_2\left(\frac{R_{two,Ff,picType}(i, l)}{R_{one,Ff,picType}(i, l)}\right),$$

wherein $\alpha$ is adjusted for the QP value ranges, the picture type, and the complexity, wherein the complexity is for the picture i.

* * * * *